(12) United States Patent
Misumi et al.

(10) Patent No.: US 8,835,050 B2
(45) Date of Patent: Sep. 16, 2014

(54) ANODE SUBSTRATE

(75) Inventors: Koichi Misumi, Kanagawa (JP);
Mitsuhiro Watanabe, Kanagawa (JP);
Hideo Honma, Kanagawa (JP)

(73) Assignees: Tokyo Ohka Kogyo Co., Ltd,
Kanagawa (JP); **Kanto Gakuin
University Surface Engineering
Research Institute**, Kanagawa (JP)

( * ) Notice: Subject to any disclaimer, the term of this patent is extended or adjusted under 35 U.S.C. 154(b) by 692 days.

(21) Appl. No.: 12/268,130

(22) Filed: Nov. 10, 2008

(65) Prior Publication Data

US 2009/0123838 A1 May 14, 2009

(30) Foreign Application Priority Data

Nov. 12, 2007 (JP) ................ 2007-293300
Nov. 12, 2007 (JP) ................ 2007-293301

(51) Int. Cl.

| | | |
|---|---|---|
| *H01M 4/134* | (2010.01) | |
| *H01M 4/60* | (2006.01) | |
| *H01M 10/058* | (2010.01) | |
| *B05D 5/12* | (2006.01) | |
| *C04B 35/00* | (2006.01) | |
| *H01M 4/70* | (2006.01) | |
| *H01M 4/66* | (2006.01) | |
| *C08L 63/00* | (2006.01) | |
| *H01M 4/139* | (2010.01) | |
| *C08G 59/68* | (2006.01) | |
| *C08L 61/06* | (2006.01) | |
| *H01M 4/13* | (2010.01) | |
| *C08G 59/32* | (2006.01) | |
| *H01M 4/1395* | (2010.01) | |
| *H01M 4/04* | (2006.01) | |
| *H01M 4/02* | (2006.01) | |

(52) U.S. Cl.
CPC .............. *H01M 4/13* (2013.01); *H01M 4/0402* (2013.01); *H01M 4/70* (2013.01); *H01M 4/668* (2013.01); *H01M 4/045* (2013.01); *C08L 63/00* (2013.01); *H01M 4/139* (2013.01); *H01M 4/134* (2013.01); *H01M 2004/028* (2013.01); *C08G 59/688* (2013.01); *C08L 61/06* (2013.01); *H01M 4/049* (2013.01); *H01M 4/661* (2013.01); *Y02E 60/122* (2013.01); *C08G 59/3218* (2013.01); *H01M 4/667* (2013.01); *H01M 4/1395* (2013.01)
USPC .......... 429/212; 429/220; 429/223; 264/104; 427/58; 29/623.5

(58) Field of Classification Search
USPC .......... 29/623.1, 25.03, 623.5; 429/234, 221, 429/223, 220, 212; 264/104; 438/455; 427/58
See application file for complete search history.

(56) References Cited

U.S. PATENT DOCUMENTS

| | | | |
|---|---|---|---|
| 2004/0058247 A1* | 3/2004 | Omaru ......................... | 429/234 |
| 2005/0142447 A1* | 6/2005 | Nakai et al. .............. | 429/231.95 |
| 2008/0127469 A1* | 6/2008 | Abe et al. ..................... | 29/25.03 |

FOREIGN PATENT DOCUMENTS

| | | | | | |
|---|---|---|---|---|---|
| CN | 1702527 | A | 11/2005 | | |
| JP | 11-73947 | A | 3/1999 | | |
| JP | 2002-083594 | A | 3/2002 | | |
| JP | 2002-289177 | A | 10/2002 | | |
| JP | 2002-373647 | A | 12/2002 | | |
| JP | 2003-017069 | A | 1/2003 | | |
| JP | 2003-31224 | A | 1/2003 | | |
| JP | 2003-142088 | A | 5/2003 | | |
| JP | 2004-127561 | A | 4/2004 | | |
| JP | 2005-196971 | A | 7/2005 | | |
| JP | 2006-173508 | A | 6/2006 | | |
| JP | 2006-269919 | | 10/2006 | | |
| JP | 2006278842 | A | * 10/2006 | ............. | H01L 21/46 |
| JP | 2007-80609 | A | 3/2007 | | |
| JP | 2007-142092 | A | 6/2007 | | |
| JP | 2007-216501 | A | 8/2007 | | |
| JP | 2007-243181 | A | 9/2007 | | |
| JP | 2007-273249 | A | 10/2007 | | |
| JP | 2009-123379 | A | 6/2009 | | |

OTHER PUBLICATIONS

Machine Translation of: JP 11073947 A, Fuji, Mar. 16, 1999.*
"Solid Lubricant Coatings Curable at 225F-300F", George Murphy, Jr., Army Weapons Command, Rock Island, Illinois, Jul. 1972, Pages: "title page" - p. 13. Retrieved online on Sep. 12, 2013 from: http://www.dtic.mil/cgi-bin/GetTRDoc?Ad=AD0754568.*
Zhao et al., "Advanced structures in electrodeposited tin base anodes for lithium ion batteries", Electrochimica Acta, vol. 52, May 4, 2007, pp. 7820-7826.
First Office Action for Chinese Patent Application No. 200810176262.8, dated Nov. 26, 2010 (with English translation).
Office Action for Korean Patent Application No. 10-2008-0110228, dated Jan. 17, 2011 (no translation available).
Notice of Reasons for Rejection issued to Japanese Application No. 2007-293301, mailed Oct. 30, 2012.
Chou, Stephen Y. et al., "Imprint of sub25 nm vias and trenches in polymers", Applied Physics Letters, vol. 67, No. 21, Nov. 20, 1995, pp. 3114-3116.
Notice of Reasons for Rejection issued to Japanese Application No. 2007-29330, mailed Nov. 13, 2012.
Notice of Reasons for Rejection issued to JP Application No. 2007-293300, mailed Oct. 22, 2013.

* cited by examiner

*Primary Examiner* — Kenneth Douyette
(74) *Attorney, Agent, or Firm* — Hoffmann & Baron, LLP

(57) ABSTRACT

An anode substrate which enables achievement of a battery having a high output voltage and a high energy density, and being superior in charge and discharge cycle characteristics; a secondary cell in which the anode substrate is used; a resin composition for use in forming the anode substrate; and a method for producing the anode substrate are provided. According to anode substrate 10 including metal film 13 formed on support 11 provided with patterned organic film 12 molded by a thermal imprint process or a photoimprint process, a battery having a high output voltage and a high energy density, and being superior in charge and discharge cycle characteristics can be provided.

16 Claims, 1 Drawing Sheet

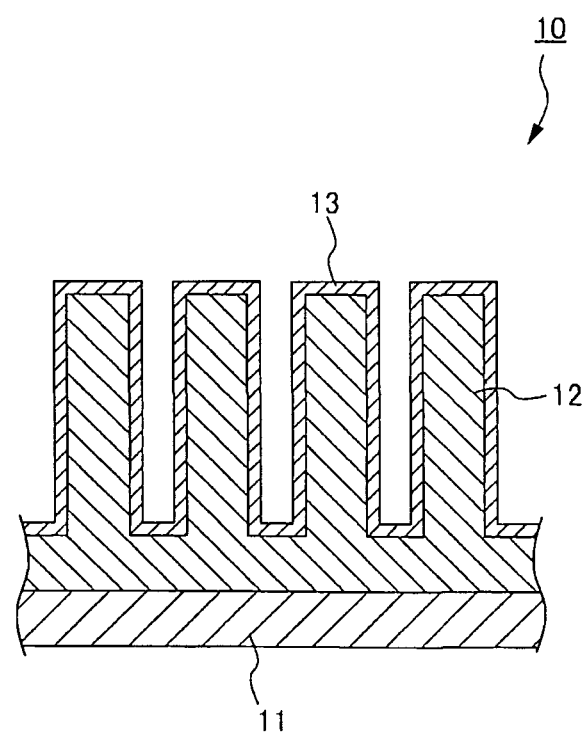

ANODE SUBSTRATE

CROSS-REFERENCE TO RELATED APPLICATIONS

This application is based on and claims the benefit of priority from Japanese Patent Application Nos. 2007-293300 and 2007-293301, respectively filed on 12 Nov. 2007, the contents of which are incorporated herein by reference.

BACKGROUND OF THE INVENTION

1. Field of the Invention

The present invention relates to an anode substrate, a secondary cell in which the anode substrate is used, a resin composition for use in forming the anode substrate, and a method for producing this anode substrate. More specifically, the present invention relates to an anode substrate which can provide a battery that is superior in charge and discharge cycle characteristics, a secondary cell in which the anode substrate is used, a resin composition for use in forming the anode substrate, and a method for producing the anode substrate.

2. Related Art

Conventionally, research and development of batteries having both a high output voltage and a high energy density have been extensively advanced. In particular, secondary cells having a low internal resistance, accompanied by less lowering of cell capacity due to charge and discharge, and that are superior in charge and discharge cycle characteristics have been demanded. For example, a lithium secondary cell in which microcrystalline silicon or amorphous silicon in a state of a thin film is used as an anode material (anode active substance) has been known (see, Patent Document 1). Specifically, a lithium secondary cell in which an anode is used that includes an anode material layer composed of a silicon thin film formed on a collector is disclosed. For forming the silicon thin film, thin film formation techniques such as CVD methods (may be also referred to as "chemical vapor-phase growth method", or "chemical vapor deposition method") and sputtering methods have been used.

In such techniques, materials such as silicon are considered to be repeatedly expanded/contracted as lithium is stored/released. Since adhesion between the collector and the anode material layer is high in the anode in which a silicon film is formed on the collector, the expansion/contraction of the collector occur frequently with the expansion/contraction of the anode material. Therefore, charging and discharging may be accompanied by irreversible deformation such as shriveling on the anode material layer and the collector. In particular, when a metal foil that is highly ductile such as copper foil is employed on a collector, the degree of deformation tends to increase. When the anode is deformed, the energy density of the battery may decrease due to an increase in electrode volume, thereby allowing a heterogeneous electrochemical reaction. In addition, while the expansion/contraction is repeated due to charging and discharging, the anode material may be pulverized and detached from the collector, or may be detached with keeping the form of a thin film in some cases. Accordingly, the charge and discharge cycle characteristics of the battery may deteriorate.

An exemplary method for inhibiting the deformation of the anode includes a method in which a material having superior mechanical strength such as high tensile strength and elastic modulus in tension is used as a collector. However, when an anode material layer composed of an anode material in the form of a thin film is formed on a collector composed of such a material, the adhesion between the collector and the anode material layer may be insufficient, whereby satisfactory charge and discharge cycle characteristics may not be achieved. Therefore, Patent Document 1 discloses a technique to inhibit occurrence of shriveling and the like while inhibiting detachment of the anode material in charging and discharging by providing a middle layer composed of a material that alloys with the anode material, and using a collector having a mechanical strength greater than that of the middle layer. Specifically, a copper layer is used as the middle layer, and nickel foil is used as the collector.

In addition to Patent Document 1 as described above, a technique is disclosed in which a thin film formed by a solid solution of copper on silicon is used as an anode material layer to control the quantity of storage of lithium, thereby inhibiting expansion of the anode material in the case of storage of lithium (see, Patent Document 2). Furthermore, a technique is disclosed in which an alloy thin film composed of a metal that alloys with lithium, and a metal that does not alloy with lithium are used to control the quantity of storage of lithium, thereby inhibiting expansion of the anode material in the case of storage of lithium (see, Patent Document 3). Specifically, as a metal that forms an intermetallic compound or a solid solution by alloying with lithium, Sn, Ge, Al, In, Mg, Si or the like is used, while Cu, Fe, Ni, Co, Mo, W, Ta, Mn or the like is used as the metal that does not alloy with lithium.

Additionally, a technique is disclosed in which deformed parts having a deformation amount of 5 μm to 20 μm in a depthwise direction are formed in an amount of 10 or more per $cm^2$, and a collector having an opening ratio of no greater than 4% provided due to the presence of the deformed parts is used, whereby deformation of the electrode resulting from charging and discharging is inhibited (see, Patent Document 4). Moreover, a technique in which a material having no storability of lithium is provided on at least one of the surface and the interior of an anode material layer in the form of a thin film which can store/release reversibly lithium is disclosed (see, Patent Document 5).

Patent Document 1: Japanese Unexamined Patent Application, First Publication No. 2002-083594
Patent Document 2: Japanese Unexamined Patent Application, First Publication No. 2002-289177
Patent Document 3: Japanese Unexamined Patent Application, First Publication No. 2002-373647
Patent Document 4: Japanese Unexamined Patent Application, First Publication No. 2003-017069
Patent Document 5: Japanese Unexamined Patent Application, First Publication No. 2005-196971

SUMMARY OF THE INVENTION

However, the various anode materials described in the foregoing have failed to achieve a battery which has sufficient output voltage, energy density, and superior charge and discharge cycle characteristics under current circumstances. Accordingly, an object of the present invention is to provide: an anode substrate which enables achievement of a battery having a high output voltage and a high energy density, and being superior in charge and discharge cycle characteristics with a construction that is different from those in the aforementioned prior arts; a secondary cell in which the anode substrate is used; a resin composition for use in forming the anode substrate; and a method for producing the anode substrate.

The present inventors extensively investigated in view of the foregoing problems, and consequently found that an anode substrate including a metal film on which a patterned organic film is formed by molding with a thermal imprint process or a photoimprint process can provide a battery which has a high output voltage and a high energy density, and is superior in charge and discharge cycle characteristics. Accordingly, the present invention has been completed.

In other words, the present invention provides: an anode substrate characterized by including a support having a patterned organic film formed by molding with a thermal imprint process or a photoimprint process, and further having a metal film formed thereon; a secondary cell in which the anode substrate is used; a resin composition for use in forming the anode substrate; and a method for producing the anode substrate.

According to the present invention, an anode substrate which enables achievement of a battery having a high output voltage and a high energy density, and being superior in charge and discharge cycle characteristics; a secondary cell in which the anode substrate is used; a resin composition for use in forming the anode substrate; and also a method for producing the anode substrate can be provided.

BRIEF DESCRIPTION OF THE DRAWINGS

FIG. 1 shows a schematic view illustrating an anode substrate according to the present invention.

DETAILED DESCRIPTION OF THE INVENTION

Embodiments of the present invention will hereinafter be described in detail with reference to the attached drawings.
Anode Substrate A schematic drawing of anode substrate 10 according to the present invention is shown in FIG. 1. As is shown in FIG. 1, the anode substrate 10 according to the present invention is composed of support 11, patterned organic film 12, and metal film 13. More specifically, the present invention is characterized by metal film 13 formed on support 11 having patterned organic film 12 molded by a thermal imprint process or a photoimprint process.
Support The support 11 used in the anode substrate 10 according to the present invention is not particularly limited as long as the patterned organic film 12 can be formed on the surface thereof. For example, conventionally well-known substrates such as boards for electronic parts may be used. Specific examples include silicon wafers, silicon wafers provided with an organic or inorganic antireflection film, silicon wafers on which a magnetic film is formed, boards made of metal such as copper, chromium, iron, or aluminum, glass boards, and the like. These supports may serve also as a collector such as a material including at least one element selected from copper, nickel, stainless steel, molybdenum, tungsten, titanium and tantalum, a metal film, a nonwoven fabric, or a metal collector having a three-dimensional structure, and they may be formed on such a collector.
Patterned Organic Film The patterned organic film 12 in the anode substrate 10 according to the present invention is formed by molding a resin composition described later with a thermal imprint process or a photoimprint process. The resin composition which may be used, and the method for forming a patterned organic film in which the resin composition is used in the thermal imprint process and the photoimprint process are explained below in this order.
Thermal Imprint Process
Resin Composition When a thermal imprint process is employed, the resin composition for use in forming the patterned organic film 12 is not particularly limited as long as it contains at least one resin component selected from an epoxy resin, a novolak resin, a hydroxystyrene resin, an acrylic resin, and a methacrylic resin.

Examples of the resin component include: epoxy resins such as bisphenol A polyfunctional epoxy resins, phenol novolak epoxy resins, cresol novolak epoxy resins, and dicyclopentadiene epoxy resins; novolac resins obtained by condensation reactions of phenols (e.g., phenol, m-cresol, p-cresol, xylenol, and trimethyl phenol) with aldehydes (e.g., formaldehyde, formaldehyde precursors, propionaldehyde, 2-hydroxybenzaldehyde, 3-hydroxybenzaldehyde, and 4-hydroxybenzaldehyde) and/or ketones (e.g., methyl ethyl ketone and acetone) in the presence of an acidic catalyst; hydroxystyrene resins such as homopolymers of hydroxystyrene, copolymers of hydroxystyrene with other styrene based monomer, and copolymers of hydroxystyrene with acrylic acid, methacrylic acid or a derivative thereof; acrylic resins of acrylic acid, methacrylic acid or a derivative thereof, or copolymers of the same; and the like.

The weight average molecular weight of the resin component can be adjusted in the range enabling an organic film to be formed on the support 11, and in particular, the weight average molecular weight (Mw) based on conversion into polystyrene on gel permeation chromatography may be preferably 2,000 to 100,000, and more preferably 3,000 to 30,000 in light of the pattern formation although it may vary depending on the type of the resin.

In addition, it is preferred that the resin composition contains an organic solvent. Such an organic solvent is not particularly limited as long as it can dissolve the resin described above, and specific examples thereof include ketones such as acetone, methyl ethyl ketone, cyclohexanone, methyl isoamyl ketone and 2-heptanone; polyhydric alcohols such as ethylene glycol, propylene glycol, diethylene glycol, ethylene glycol monoacetate, propylene glycol monoacetate and diethylene glycol monoacetate, or monomethyl ethers, monoethyl ethers, monopropyl ethers, monobutyl ethers, monophenyl ethers and the like thereof, and derivatives of the same; cyclic ethers such as dioxane; esters such as methyl acetate, ethyl acetate, butyl acetate, etyl lactate, methyl pyruvate, ethyl pyruvate, methyl methoxypropionate and ethyl ethoxypropionate; γ-butyrolactone, and the like.

It is preferred to use at least one organic solvent selected from propylene glycol monomethyl ether, propylene glycol monobutyl ether, propylene glycol monomethyl ether acetate, 2-heptanone, methyl lactate, ethyl lactate, and γ-butyrolactone among the organic solvents described above. When such a solvent is used, it is desired that the solvent be included in an amount of no less than 50% by mass in the entire organic solvent.
Process for Forming Patterned Organic Film The patterned organic film 12 can be formed by using a thermal imprint process in which the resin composition is applied on the support 11 with a spinner to form an organic film, and thereafter a mold material is pressed against the organic film under predetermined conditions and then the mold material is released.

It is preferred that the aspect ratio of the patterned organic film 12 obtained as described above be no less than 0.1. When the aspect ratio of the patterned organic film 12 is no less than 0.1, the surface area of the anode substrate 10 increases, whereby the amount of the metal film formed by a plating process described later increases. Consequently, an additionally higher output voltage and higher energy density can be achieved.

The aforementioned mold material is not particularly limited as long as it is a material which is generally used in thermal imprint processes. Specifically, mold materials composed of quartz, silicon, silicon dioxide, various metal materials or the like can be used. In addition, the surface of the mold material can be subjected beforehand to a mold release treatment using a mold release agent such as a fluorine based or silicon based mold release agent.

Also, the predetermined conditions in pressing the mold material are not particularly limited as long as they are the conditions which may be generally employed in thermal imprint processes. However, in general, the process is carried out by heating a board in the temperature range of 20 to 250° C., pressing the mold under a compression condition of 1 to 1000 N for a certain time period, cooling the board while keeping the state of pressing to allow the organic film to be cured, and then releasing the mold material from the organic film. Moreover, with respect to the residual film part of the organic film corresponding to the relief part of the mold material, it may be removed by an oxygen plasma etching process or the like after forming the patterned organic film. Alternatively, the pattern may be cured after forming the patterned organic film 12, by subjecting the patterned organic film to a heat treatment. Otherwise, the surface may be cured by light irradiation (UV cure) prior to subjecting to the heat treatment.

Photoimprint Process
Resin Composition

When a photoimprint process is employed, the resin composition for use in forming the patterned organic film 12 is not particularly limited as long as it contains at least one resin component selected from an epoxy resin, a hydroxystyrene resin, an acrylic resin, and a methacrylic resin.

Examples of the resin component include: epoxy resins such as bisphenol A novolak type epoxy resins, phenol novolak epoxy resins, cresol novolak epoxy resins, and dicyclopentadiene epoxy resins; hydroxystyrene resins such as homopolymers of hydroxystyrene, copolymers of hydroxystyrene with other styrene based monomer, and copolymers of hydroxystyrene with acrylic acid, methacrylic acid or a derivative thereof; acrylic resins of acrylic acid, methacrylic acid or a derivative thereof, or copolymers of the same; and the like.

The weight average molecular weight of the resin component can be adjusted in the range enabling an organic film to be formed on the support 11, and in particular, the weight average molecular weight (Mw) based on conversion into polystyrene on gel permeation chromatography may be preferably 2,000 to 100,000, and more preferably 3,000 to 30,000 in light of the pattern formation although it may vary depending on the type of the resin.

In addition, it is preferred that the resin composition contains an organic solvent. As such an organic solvent, those described above for the thermal imprint process can be used.

In addition, it is preferred that a photopolymerization initiator be included in the resist composition, and an arbitrary photopolymerization initiator employed in known resist compositions can be used as the photopolymerization initiator. Specific examples of such photopolymerization initiators include halogen-containing triazine compounds, oxime sulfonate group-containing compounds, onium salts having a naphthalene ring at the cationic moiety, bissulfonyldiazomethanes, nitrobenzyl derivatives, sulfonic esters, trifluoromethane sulfonic esters, onium salts, benzoin tosylates, diphenyl iodonium salts, triphenyl sulfonium salts, phenyl diazonium salts, benzyl carbonates, and the like. When such a photopolymerization initiator is blended, the blending amount it is preferably 0.05 to 5% by mass in the resin composition.

Furthermore, a crosslinking agent may be also blended in the resist composition, and specific examples of the crosslinking agent which can be used include amino compounds such as e.g., melamine, urea, guanamine, glycoluril-formaldehyde, succinyl amide-formaldehyde, and ethylene urea-formaldehyde resins, and the like. When such a crosslinking agent is blended, it is preferably blended in the range of 1 to 30 parts by mass per 100 parts by mass of the resin component.

Process for Forming Patterned Organic Film

The patterned organic film 12 can be formed by using a photoimprint process in which the resin composition is applied on the support 11 with a spinner to form an organic film, and thereafter a mold material is pressed against the organic film under predetermined conditions followed by photoirradiation and then the mold material is released from the organic film.

It is preferred that the aspect ratio of the patterned organic film 12 obtained as described above be no less than 0.1. When the aspect ratio of the patterned organic film 12 is no less than 0.1, the surface area of the anode substrate 10 increases, whereby the amount of the metal film formed by a plating process described later increases. Consequently, an additionally higher output voltage and higher energy density can be achieved.

The mold material is not particularly limited as long as it is a material which is generally used in photoimprint processes. Specifically, mold materials composed of quartz, sapphire or the like can be used. In addition, the surface of the mold material can be subjected beforehand to a mold release treatment using a mold release agent such as a fluorine based or silicon based mold release agent.

Also, the predetermined conditions in forming the patterned organic film 12 are not particularly limited as long as they are the conditions which may be generally employed in photoimprint processes. However, in general, the process is carried out by adjusting the pressing condition of the mold material to give a pressure of 1 to 1000 N, thereafter irradiating a light of 200 to 500 nm on the entire face to allow the organic film to be cured, and then releasing the mold material from the organic film. Moreover, with respect to the residual film part of the organic film corresponding to the relief part of the mold material, it may be removed by an oxygen plasma etching process or the like after forming the patterned organic film 12. Alternatively, the pattern may be cured after forming the patterned organic film 12, by subjecting the patterned organic film to a heat treatment. Otherwise, the surface may be also cured by light irradiation (UV cure) prior to subjecting to the heat treatment.

Metal Film

The metal film 13 in the anode substrate 10 according to the present invention is preferably formed by a plating process, but is not limited in particular. As the plating process, a conventionally well known technique may be employed, and is not particularly limited as long as the metal film 13 can be formed on the patterned organic film 12 as described above. In addition, the metal film 13 may be composed of multiple layers formed by a multistep plating process. The step of forming such metal film 13, i.e., the plating process step, preferably includes: a washing step; a catalyzing treatment step, followed by an electroless nickel plating or electroless copper plating step; and further an electroless tin plating step, or an electrolytic tin plating step.

The plating process which is suitable in the present invention is specifically explained below.

Washing Step

The support 11 having the patterned organic film 12 is first washed by immersing in a phosphoric acid based solution. Sodium phosphate or the like may be used in the phosphoric acid based solution. The immersing time period is preferably 30 to 180 sec, and more preferably 45 to 90 sec.

Catalyzing Step

The support 11 following the washing step is immersed in an aqueous solution of tin chloride ($SnCl_2$) having a certain concentration for a predetermined time period. The concentration of tin chloride is preferably 0.01 $g/dm^3$ to 0.10 $g/dm^3$, and more preferably 0.03 $g/dm^3$ to 0.07 $g/dm^3$. Furthermore, the immersion time period is preferably 15 to 180 sec, and more preferably 30 to 60 sec.

Next, the support 11 immersed in the aqueous tin chloride ($SnCl_2$) solution for a predetermined time period is immersed in an aqueous solution of palladium chloride ($PdCl_2$) having a certain concentration for a predetermined time period. The concentration of palladium chloride is preferably 0.01 $g/dm^3$ to 0.3 $g/dm^3$, and more preferably 0.03 $g/dm^3$ to 0.07 $g/dm^3$. Furthermore, the immersion time period is preferably 15 to 180 sec, and more preferably 30 to 60 sec.

Electroless Nickel Plating Step

The support 11 following the catalyzing step is subjected to nickel plating by immersing in a nickel plating bath. As the nickel plating bath, a conventionally well-known one may be used. For example, a nickel plating bath including 0.05 M to 0.20 M nickel sulfate, 0.10 M to 0.30 M sodium hypophosphite, a 0.05 ppm to 0.30 ppm lead ion, and a 0.05 M to 0.30 M complexing agent may be exemplified. As the complexing agent, a complexing agent of a carboxylic acid is preferably used. The temperature of the nickel plating bath is preferably 50° C. to 70° C., and the pH is preferably 4.0 to 5.5. For adjusting the pH, sodium hydroxide or sulfuric acid may be used.

In place of the electroless nickel plating, electroless copper plating may be also performed. As a copper plating bath, a conventionally well-known one may be used.

Electroless Copper Plating Step

The support 11 following the catalyzing step is subjected to copper plating by immersing in a copper plating bath. As a copper plating bath, a conventionally well-known one may be used. For example, a copper plating bath including 0.02 M to 0.10 M copper sulfate, 0.10 M to 0.40 M formalin, 1.0 ppm to 20.0 ppm 2,2'-bipyridyl, a 50.0 ppm to 500 ppm surfactant (polyethylene glycol or the like), and a 0.20 M to 0.40 M complexing agent may be exemplified. As the complexing agent, an ethylene-amine based complexing agent is preferably used. The temperature of the copper plating bath is preferably 50° C. to 70° C., and the pH is preferably 11.5 to 12.5. Also, it is preferable to carry out stirring by aeration. For adjusting the pH, potassium hydroxide or sulfuric acid may be used.

Electroless Tin Plating Step

The support 11 following the electroless nickel plating, or electroless copper plating step is subjected to tin plating by immersing in a tin plating bath to form a metal film 13 on the patterned organic film 12. As the tin plating bath, a conventionally well-known one may be used. For example, a tin plating bath including 0.02 M to 0.20 M tin chloride, a 0.02 M to 0.08 M reducing agent such as titanium trichloride, and a 0.10 M to 0.50 M complexing agent such as trisodium citrate, disodium ethylene diamine tetraacetate (EDTA-2Na), and nitrilotriacetic acid (NTA) may be exemplified. The temperature of the tin plating bath is preferably 45° C. to 70° C., and the pH is preferably 6.5 to 8.5. For adjusting the pH, sodium carbonate, or ammonia and hydrochloric acid may be used. It is preferred that the tin plating process be performed in a nitrogen atmosphere.

Electrolytic Tin Plating Step

In place of the electroless tin plating, electrolytic tin plating may be also performed. According to such a tin plating step, the support 11 following the electroless nickel plating, or electroless copper plating step is subjected to electrolytic tin plating by immersing in a tin plating bath and applying a current to form a metal film 13 on the patterned organic film 12. As the electrolytic tin plating bath, a conventionally well-known one may be used. For example, a plating liquid commercially available from Leybold Co., Ltd., i.e., Starter Kurumo tin plating bath may be exemplified. The temperature of the tin plating bath is preferably 10° C. to 28° C., and the pH is preferably 1.0 to 1.5. Also, the current density which may be applied is preferably 0.5 $A/dm^2$ to 6.0 $A/dm^2$.

Secondary Cell

The anode substrate 10 is suitably used as an anode substrate for secondary cells, and particularly as an anode substrate for lithium secondary cells. In lithium secondary cells, an organic solvent and a lithium salt are used as an electrolyte, whereby charging and discharging is performed by acceptance and donation of the electric charge resulting from transfer of the lithium ion ($Li^+$) between the anode and cathode. Thus, it is advantageous in having a high output voltage, and a high energy density. In conventional lithium secondary cells, carbon is used as an anode, while a transition metal oxide lithium compound is used as a cathode, in general. However, in recent years the investigation of anode materials that provide additionally higher output and higher energy density has progressed. It is necessary that the anode material can form a thin film and can store/release lithium reversibly. Thus, the aforementioned anode substrate 10 can be suitably used to meet these needs. The term "storage" referred to herein means to reversibly include lithium within, to form an alloy, a solid solution or the like with lithium reversibly, and to make a chemical bond with lithium reversibly.

When the anode substrate 10 is used as an anode material of lithium secondary cells, it is necessary to laminate the anode substrate 10 on a collector to form an anode. However, when the support 11 has conductivity, such lamination is not required, and the support 11 itself can serve as a collector. The collector is acceptable as long as it has conductivity, and the materials and the structure thereof are not limited in particular. Collectors conventionally used in general lithium secondary cells may be employed. Preferably, the collector exhibits favorable adhesion with the anode substrate 10. Also, it is preferred that the material does not alloy with lithium. Specific examples of the material include those containing at least one element selected from the group consisting of copper, nickel, stainless steel, molybdenum, tungsten, titanium and tantalum. Also, structures such as a metal foil, a nonwoven fabric, and a metal collector having a three-dimensional structure are preferable. Particularly, a metal foil is preferably used, and more specifically, a copper foil is preferably used. The thickness of the collector is not particularly limited.

In general, according to an anode formed by laminating an anode material layer in the form of a thin film on a collector, internal resistance can be reduced as compared with the anode formed by laminating an anode material in the form of particles together with a binding agent and the like. In other words, the anode formed by laminating the anode substrate 10 on a collector can yield a lithium secondary cell having a high electric generating capacity. However, in the anode formed by laminating the anode material layer in the form of a thin film on a collector, adhesion of the anode material layer with the collector becomes so great that deformation such as shriveling may result on the anode material layer or the collector upon expansion/contraction of the anode material layer resulting from charging and discharging. In particular, when a metal foil that is highly ductile such as a copper foil is used as a collector, the extent of deformation is likely to increase. Thus, the energy density of a battery is lowered, whereby the charge and discharge cycle characteristics can be deteriorated by merely laminating on a collector an anode material layer in the form of a thin film.

In contrast, since the anode substrate 10 according to the present invention has a structure in which the metal film 13 is laminated on the patterned organic film 12, the stress generated by expansion/contraction of the metal film 13 resulting from storage/release of the lithium may relax due to a buffer action of the patterned organic film 12. Therefore, as a result of the capability of suppressing an increase in the stress generated upon charge and discharge, generation of deformation such as shriveling can be suppressed in the anode substrate and the collector. In turn, cracking of anode substrate 10, and detachment from the collector can be suppressed. In other words, the anode formed by laminating the anode substrate 10 on a collector can yield a lithium secondary cell having a high output voltage and a high energy density, and being superior in charge and discharge cycle characteristics.

The construction of the cell, but not that of the anode, is not particularly limited, and may have a construction similar to those of conventionally well-known lithium secondary cells. Specifically, the cell is predominantly constructed with a cathode which can store/release lithium reversibly, and an electrolyte having lithium conductivity. The electrolyte is held by a separator as need, and is brought into contact with the anode and the cathode in the state held by the separator, whereby exchange of lithium is performed.

The cathode is not particularly limited as long as it can store/release lithium reversibly, and the cathode generally employed in lithium secondary cells may be used. Specifically, the cathode formed by laminating a cathode material layer on a collector may be used. For example, the cathode may be formed by: dispersing a cathode material and a conductive agent, and a binding agent in a dispersion solvent to give a slurry; applying the slurry on a collector; and thereafter drying. The thickness of the collector and the cathode material layer is not particularly limited, and may be predetermined appropriately depending on the battery design capacity, and the like.

Also, the cathode material is not particularly limited, and a conventionally well-known material such as oxides including lithium and a transition element can be used. More specifically, $LiCoO_2$, $LiNiO_2$, $LiMnO_2$, $LiMn_2O_4$, $LiCo_{0.5}Ni_{0.5}O_2$ or the like may be used. The conductive material is not particularly limited as long as it has electric conductivity, and for example, acetylene black, carbon black, graphite powder or the like may be used. The binding agent is not particularly limited as long as it enables the shape of the cathode material layer to be retained after forming the cathode, and a resin based binding agent such as a rubber based binding agent or a fluorocarbon resin may be used.

The separator is acceptable as long as it can hold the electrolyte having lithium conductivity, and can keep electric insulation between the cathode and the anode, with the material, the structure and the like of the separator not being limited in particular. For example, a porous resin thin film such as a porous polypropylene thin film or a porous polyethylene thin film, or a resin nonwoven fabric including polyolefin or the like may be used.

The electrolyte is not particularly limited as long as it has lithium conductivity. For example, a nonaqueous electrolyte solution prepared by dissolving in a nonaqueous solvent an electrolyte containing lithium may be used. As the electrolyte containing lithium, for example, a lithium salt such as $LiPF_6$, $LiBF_4$, $LiClO_4$, $LiAsF_6$, or $LiCF_3SO_3$ may be used. Examples of the nonaqueous solvent which may be used include e.g., cyclic carbonic acid esters such as propylene carbonate, ethylene carbonate and butylene carbonate; chain carbonic acid esters such as dimethyl carbonate, methylethyl carbonate and diethyl carbonate; cyclic ethers such as tetrahydrofuran and 1,3-dioxolane; chain ethers such as 1,2-dimethoxy ethane, 1,2-diethoxyethane and ethoxymethoxyethane; cyclic esters such as γ-butyrolactone; chain esters such as methyl acetate; and mixed solvents of these nonaqueous solvents. The concentration of the nonaqueous electrolyte solution is not particularly limited. As the electrolyte, a polymer electrolyte, a solid electrolyte or the like may be also used.

The lithium secondary cell in which the anode substrate 10 according to the present invention is used as an anode may have a variety of shapes such as a coin shape, a cylindrical shape, a square shape and a plane shape. Also, the capacity is not particularly limited, and thus the lithium secondary cell of the present invention is applicable to any battery including from minute batteries used in precision instruments and the like to large-sized batteries used in hybrid cars and the like.

EXAMPLES

The present invention will be explained in more detail by way of Examples. It should be noted that the present invention is not limited to the following Examples.

Example 1

A negative photoresist composition was prepared by mixing 100 parts by mass of "Epicoat 157S70 (trade name, manufactured by Japan Epoxy Resins Co., Ltd.)" that is a polyfunctional bisphenol A novolak epoxy resin, 5 parts by mass of "UVI-6992 (trade name, manufactured by The Dow Chemical Corporation)" that is a mixture of diphenyl[4-(phenylthio)phenyl]sulfonium hexafluorophosphate and thiodi-p-phenylene bis(diphenylsulfonium) bis(hexafluorophosphate), 5 parts by mass of 1,5-dihydroxynaphthalene, and 43 parts by mass of γ-butyrolactone.

After thus resulting negative photoresist composition was applied on a silicon wafer with a spin coater, it was prebaked by a hot plate at 60° C. for 5 min, and at 90° C. for 5 min, whereby an organic film having a film thickness of 30 μm was obtained. An Si mold material was pressed on this organic film using a NM401 Imprinter (manufactured by Meisyo Kiko Co., Ltd.) under a pressing condition of 200 N at 90° C. for 1 min. Thereafter, the board was cooled to 23° C., and then the mold material was separated away from the organic film to form a patterned organic film with a pillar shape having a diameter of 10 μm (pitch (spacing): 20 μm).

The silicon wafer having the patterned organic film thus formed thereon was subjected to a washing treatment by immersing in a sodium phosphate solution for 60 sec. Subsequently, the silicon wafer following the washing step was subjected to a catalyzing step by immersing in a 0.05 g/dm³ aqueous tin chloride ($SnCl_2$) solution for 60 sec, and further immersing in a 0.05 g/dm³ aqueous palladium chloride ($PdCl_2$) solution for 60 sec.

Next, the silicon wafer following the catalyzing step was subjected to a nickel plating process by immersing in a nickel plating bath including 0.20 M nickel sulfate, 0.30 M sodium hypophosphite, a 0.30 ppm lead ion, and a 0.30 M complexing agent of carboxylic acids. In this step, the temperature of the nickel plating bath was regulated to be 70° C., and the pH was adjusted to 5.5.

Additionally, the silicon wafer following the electroless nickel plating step was subjected to a tin plating process by immersing in a tin plating bath including 0.20 M tin chloride, a 0.08 M reducing agent such as titanium trichloride, and 0.50 M trisodium citrate. In this step, the temperature of the tin plating bath was regulated to be 70° C., and the pH was adjusted to 8.5.

Example 2

An anode substrate was formed by a similar process to Example 1 except that the following positive photoresist composition was used in place of the negative photoresist composition used in Example 1.

A positive photoresist composition having a solid content of 40% by mass was prepared by uniformly dissolving in propylene glycol monomethylether acetate: 1 part by mass of [2-(propylsulfonyloxyimino)-2,3-dihydrothiophene-3-ylidene] (o-tolyl)acetonitrile (IRGACURE PAG103 (trade name), manufactured by Ciba Specialty Chemicals plc.), 40 parts by mass of a resin having a solubility in alkali increased by an action of an acid represented by the following formula (z1), 60 parts by mass of a novolak resin obtained by addition condensation of m-cresol and p-cresol in the presence of formaldehyde and an acid catalyst and 1 part by mass of 1,5-dihydroxynaphthalene, and filtrating through a membrane filter having a pore size of 1 μm.

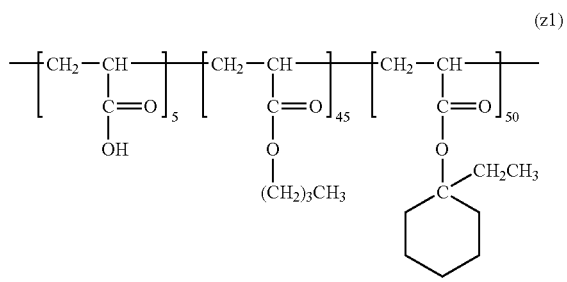

(z1)

Using the anode substrate obtained in Examples 1 and 2, a nonaqueous electrolyte secondary cell was produced by the following procedure. The electric discharge capacity following one to three cycles of this cell was measured by the following method. The results are shown in Table 1 below.

The anode substrate obtained in Examples 1 and 2 as a working electrode, and $LiCoO_2$ as a counter electrode (cathode) were used to allow both electrodes to be opposed via a separator. A mixture of $LiPF_6$/ethylene carbonate and dimethyl carbonate (1:1 by capacity ratio) was used as a nonaqueous electrolyte, and a nonaqueous electrolyte secondary cell was produced according to an ordinary process. In this nonaqueous electrolyte secondary cell, the capacity ratio of the cathode to the anode was 1:1.

For each electric discharge capacity following one to three cycles, the electric discharge capacity per unit volume (mAh/cm$^2$) was measured. The electric discharge capacity per unit volume was determined on the basis of the volume of the anode as a standard. However, the expansion of the anode while charging was not considered.

TABLE 1

| | Electric discharge capacity (mAh/cm$^2$) | | |
|---|---|---|---|
| | Following one cycle | Following two cycles | Following three cycles |
| Example 1 | 2496 | 2367 | 2412 |
| Example 2 | 2205 | 2321 | 2380 |

With respect to the anode substrate described above, the surface area of the anode substrate subjected to the tin plating process of Example accounted for about 190% of the surface area yielded by subjecting to the same plating process on a plane.

Example 3

A negative photoresist composition was prepared by mixing 100 parts by mass of "Epicoat 157S70 (trade name, manufactured by Japan Epoxy Resins Co., Ltd.)" that is a polyfunctional bisphenol A novolak epoxy resin, 5 parts by mass of "UVI-6992 (trade name, manufactured by The Dow Chemical Corporation)" that is a mixture of diphenyl[4-(phenylthio)phenyl]sulfonium hexafluorophosphate and thiodi-p-phenylene bis(diphenylsulfonium) bis(hexafluorophosphate), 5 parts by mass of 1,5-dihydroxynaphthalene, and 43 parts by mass of γ-butyrolactone.

Thus, the resulting resist composition was spin coated on a silicon wafer, and subjected to a prebaking treatment at 60° C. for 5 min, and at 90° C. for 5 min, whereby an organic film having a film thickness of 30 μm was obtained. A quartz mold material was pressed against this organic film using a NM401 Imprinter (manufactured by Meisyo Kiko Co., Ltd.) under a pressing condition of 200 N for 5 min. Ultraviolet light was irradiated on the entire face of the board with an extra-high pressure mercury lamp using an ultraviolet ray irradiation equipment TOSCURE252 manufactured by HARISON TOSHIBA LIGHTING Corporation in an exposure amount of 1,500 mJ/cm$^2$. Thereafter, the mold material was separated away from the organic film to form a patterned organic film with a pillar shape having a diameter of 10 μm (pitch: 20 μm).

The silicon wafer having the patterned organic film thus formed thereon was subjected to a washing treatment by immersing in a sodium phosphate solution for 60 sec. Subsequently, the silicon wafer following the washing step was subjected to a catalyzing step by immersing in a 0.05 g/dm$^3$ aqueous tin chloride (SnCl$_2$) solution for 60 sec, and further immersing in a 0.05 g/dm$^3$ aqueous palladium chloride (PdCl$_2$) solution for 60 sec.

Next, the silicon wafer following the catalyzing step was subjected to a nickel plating process by immersing in a nickel plating bath including 0.20 M nickel sulfate, 0.30 M sodium hypophosphite, a 0.30 ppm lead ion, and a 0.30 M complexing agent of carboxylic acids. In this step, the temperature of the nickel plating bath was regulated to be 70° C., and the pH was adjusted to 5.5.

Additionally, the silicon wafer following the electroless nickel plating step was subjected to a tin plating process by immersing in a tin plating bath including 0.20 M tin chloride, a 0.08 M reducing agent such as titanium trichloride, and 0.50 M trisodium citrate. In this step, the temperature of the tin plating bath was regulated to be 70° C., and the pH was adjusted to 8.5.

Using the anode substrate obtained in Example 3 described above, a nonaqueous electrolyte secondary cell was produced by the following procedure. The electric discharge capacity following one to three cycles of this cell was measured by the following method. The results are shown in Table 2 below.

The anode substrate obtained in Example 3 as a working electrode, and LiCoO$_2$ as a counter electrode (cathode) were used to allow both electrodes to be opposed via a separator. A mixture of LiPF$_6$/ethylene carbonates and dimethyl carbonate (1:1 by capacity ratio) was used as a nonaqueous electrolyte, and a nonaqueous electrolyte secondary cell was produced according to an ordinary process. In this nonaqueous electrolyte secondary cell, the capacity ratio of the cathode to the anode was 1:1.

For each electric discharge capacity following one to three cycles, the electric discharge capacity per unit volume (mAh/cm$^2$) was measured. The electric discharge capacity per unit volume was determined on the basis of the volume of the anode as a standard. However, the expansion of the anode while charging was not considered.

TABLE 2

| | Electric discharge capacity (mAh/cm$^2$) | | |
| --- | --- | --- | --- |
| | Following one cycle | Following two cycles | Following three cycles |
| Example 3 | 2818 | 2754 | 2913 |

With respect to the anode substrate described above, the surface area of the anode substrate subjected to the tin plating process of Example accounted for about 190% of the surface area yielded by subjecting to the same plating process on a plane.

INDUSTRIAL APPLICABILITY

According to the anode substrate of the present invention, achieving a battery which has a high output voltage and a high energy density, and is superior in charge and discharge cycle characteristics is enabled. The battery can be used in a variety of applications regardless of the capacity, such as e.g., batteries including from minute batteries used in portable devices and the like to large-sized batteries used in hybrid cars and the like.

What is claimed is:

1. An anode substrate comprising a patterned organic film molded by a thermal imprint process provided on a support, and metal film formed on the patterned organic film, such that said metal film rests on said organic film and does not touch said support,
wherein the patterned organic film is molded by a thermal imprint process of a resin composition comprising at least one resin component selected from the group consisting of an epoxy resin, a novolac resin, a hydroxystyrene resin, an acrylic resin, and a methacrylic resin.

2. The anode substrate according to claim 1 wherein the patterned organic film has an aspect ratio of no less than 0.1.

3. The anode substrate according to claim 1 wherein the metal film is formed by a plating process.

4. The anode substrate according to claim 3 wherein the plating process is at least one plating process selected from the group consisting of an electroless copper plating process, an electroless nickel plating process, an electroless tin plating process, and an electrolytic tin plating process.

5. The anode substrate according to claim 3 wherein the plating process is a multistep plating process including at least one plating process selected from the group consisting of an electroless copper plating process and an electroless nickel plating process, and at least one plating process selected from the group consisting of an electroless tin plating process and electrolytic tin plating process.

6. The anode substrate according to claim 1 which is an anode substrate for a secondary cell.

7. A secondary cell comprising: the anode substrate according to claim 1; an electrolyte; and a cathode substrate which can store and release the electrolyte.

8. A method for producing an anode substrate comprising the steps of:
   (i) applying a resin composition on a support to form an organic film;
   (ii) subjecting the organic film to a heat treatment while pressing a mold thereon to form a patterned organic film; and
   (iii) forming a metal film on the patterned organic film by a plating process such that said metal film does not touch said support,
   wherein, the resin composition comprises at least one resin component selected from the group consisting of an epoxy resin, a novolak resin, a hydroxystyrene resin, an acrylic resin, and a methacrylic resin.

9. A method for producing an anode substrate comprising the steps of:
   (i) applying a resin composition on a support to form an organic film;
   (ii) pressing a mold against the organic film, followed by allowing the entire face of the organic film to be cured, thereby forming a patterned organic film; and
   (iii) forming a metal film on the patterned organic film by a plating process such that said metal film does not touch said support,
   wherein, the resin composition comprises at least one resin component selected from the group consisting of an epoxy resin, a hydroxystyrene resin, an acrylic resin, and a methacrylic resin.

10. An anode substrate comprising a patterned organic film molded by a photoimprint process provided on a support, and metal film formed on the patterned organic film, such that said metal film rests on said organic film and does not touch said support,
wherein the patterned organic film is molded by a photoimprint process of a resin composition comprising at least one resin component selected from the group consisting of an epoxy resin, a hydroxystyrene resin, an acrylic resin, and a methacrylic resin.

11. The anode substrate according to claim 10 wherein the patterned organic film has an aspect ratio of no less than 0.1.

12. The anode substrate according to claim 10 wherein the metal film is formed by a plating process.

13. The anode substrate according to claim 12 wherein the plating process is at least one plating process selected from the group consisting of an electroless copper plating process, an electroless nickel plating process, an electroless tin plating process, and an electrolytic tin plating process.

14. The anode substrate according to claim 12 wherein the plating process is a multistep plating process including at least one plating process selected from the group consisting of an electroless copper plating process and an electroless nickel plating process, and at least one plating process selected from the group consisting of an electroless tin plating process and electrolytic tin plating process.

15. The anode substrate according to claim 10 which is a anode substrate for a secondary cell.

16. A secondary cell comprising: the anode substrate according to claim 10; an electrolyte; and a cathode substrate which can store and release the electrolyte.

* * * * *